Patented Nov. 4, 1952

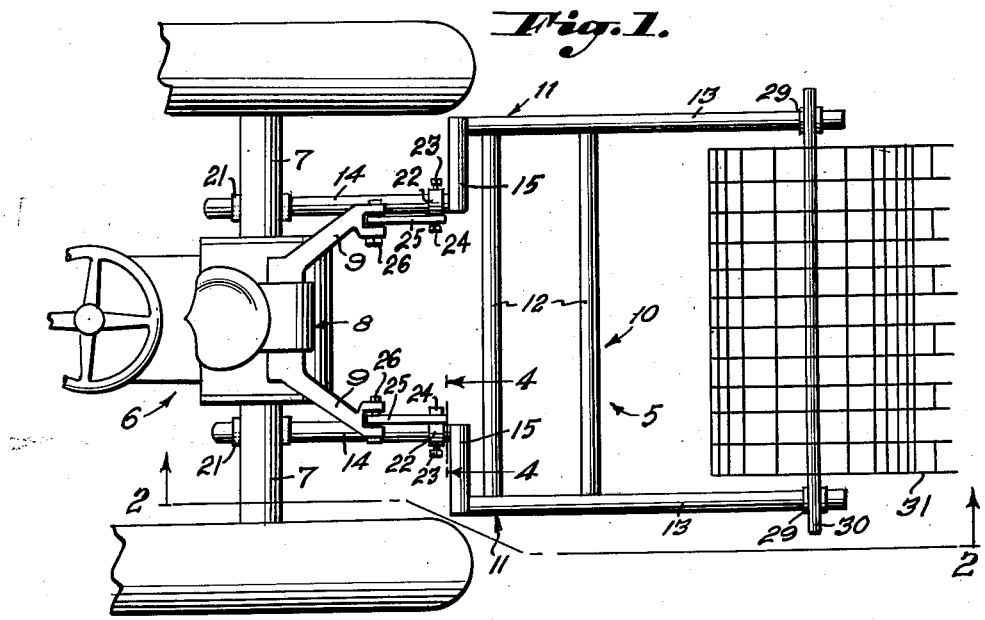
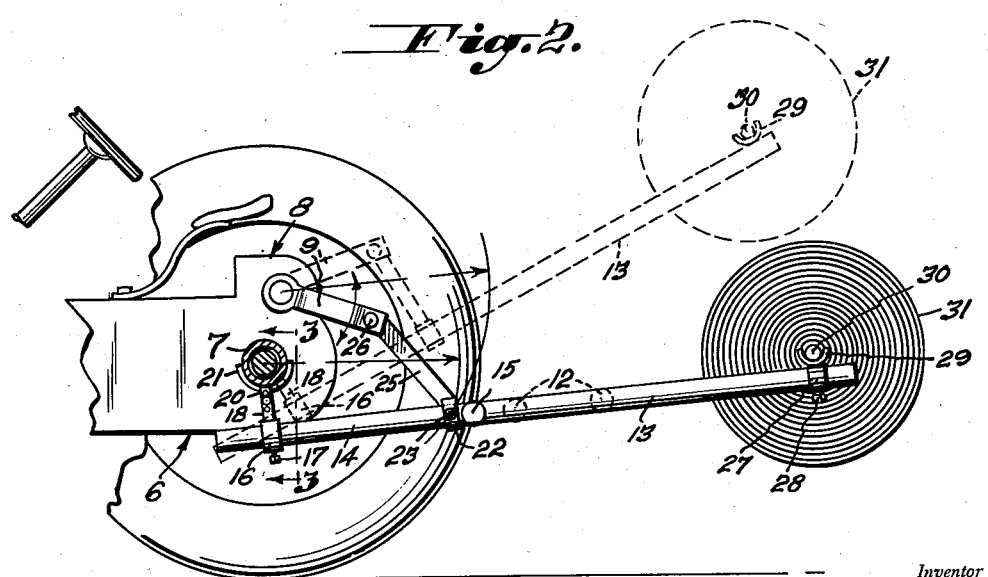
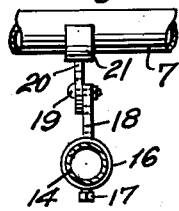
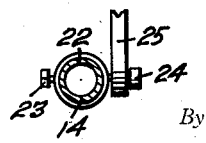

2,616,636

UNITED STATES PATENT OFFICE 2,616,636

ROLLED WIRE ATTACHMENT FOR VEHICLES

Wilbur Aden, Golden, Ill.

Application January 18, 1950, Serial No. 139,273

3 Claims. (Cl. 242—90)

This invention relates to a novel construction of support for rolled wire such as mesh fence wire, or a spool of plain or barbed wire and which attachment may be quickly and easily applied to or removed from a wheeled vehicle such as a tractor and is especially adapted for use in conjunction with a tractor having a hydraulic hoist by means of which the wire supporting device may be raised or lowered for supporting the wire at any desired level and for positioning the device so that the roll of wire may be applied thereto while resting on the ground and without requiring lifting of the roll of wire.

A further object of the invention is to provide a device which may be utilized for loading rolls of wire onto a trunk or for receiving a roll of wire directly from a truck thereby eliminating the manual labor required in lifting large and heavy rolls of wire.

Various other objects and advantages of the invention will hereinafter become more fully apparent from the following description of the drawing, illustrating a presently preferred embodiment thereof, and wherein:

Figure 1 is a top plan view showing the wire support mounted on the rear end of a tractor;

Figure 2 is a side elevational view thereof taken substantially along a plane as indicated by the line 2—2 of Figure 1;

Figure 3 is an enlarged cross sectional view taken substantially along a plane as indicated by the line 3—3 of Figure 2, and Figure 4 is an enlarged cross sectional view taken substantially along a plane as indicated by the line 4—4 of Figure 1.

Referring more specifically to the drawing, for the purpose of illustrating a preferred application and use of the rolled wire supporting device, designated generally 5 and comprising the invention, the rear end of a conventional tractor has been illustrated in Figures 1 and 2 and is designated generally 6 and includes the rear axle housing 7 and a conventional hydraulic or other type of hoist, designated generally 8 and including corresponding rearwardly extending rearwardly diverging hoist arms 9 which are vertically swingable.

The wire supporting device 5 includes a frame, designated generally 10 composed of corresponding side members or arms 11 and a plurality of cross braces 12. The side members or arms 11 include rear portions 13 which are spaced a greater distance apart than the forward portions 14 of said arms 11. The arm portions 13 and 14 are connected by aligned transversely extending portions 15. The cross braces 12 extend between the rear arm portions 13 and are disposed near to the transverse portions 15 so that said arm portions 13 can extend a considerable distance rearwardly and beyond the rearmost cross brace 12. The frame parts 11 and 12 are preferably but not necessarily of tubular construction.

A collar 16 is mounted on each arm portion 14 and is adjustably secured thereto near its forward end by a set screw 17. Each collar 16 is provided with an upstanding apertured standard 18 which is adjustably connected by nut and bolt fastenings 19 to an apertured standard 20 the upper end of which extends above the upper end of the standard 18 and has secured thereto a yoke 21 of arcuate shape and which is provided with an upper concave side which engages under a portion of the axle housing 7, as clearly illustrated in Figures 2 and 3. Each of the arm portions 14 is provided with a second collar 22 which is adjustably secured thereto by a set screw 23 forwardly of the collars 16 and adjacent the transverse arm portions 15. As seen in Figure 4, each collar 22 has a headed stud 24 projecting therefrom in a direction inwardly with respect to the frame 10. One end of a link 25 is pivotally connected to each stud 24. The links 25 extend upwardly from the studs 24 and are pivotally connected at their opposite ends to the diverging rear ends of the hoist arms 9 by pivot pins 26 so that the frame 10 is supported by the links 25 on the hoist arms 9 and by engagement of the yokes 21 beneath the axle housing 7.

Each arm portion 13, rearwardly of the cross braces 12, has a collar 27 adjustably secured thereto by a setscrew 28. Each collar 27 is also provided with an upwardly facing arcuate bearing member 29 having a concave upper side. The collars 27 are secured to the frame 10 in transverse alignment as are also the collars 22 and the collars 16.

The upwardly opening bearing members 29 are adapted to receive and rotatably engage end portions of a rod or pipe 30 which extends through a roll of wire 31 which may constitute mesh wire such as is used for fences or a single strand of plain or barbed wire or said rod 30 may extend through a spool or reel of wire. Assuming that the wire roll 31 is lying on the ground, the rod 30 may be passed axially therethrough as illustrated in Figure 1 and the hydraulic hoist 8 may then be actuated for lowering the rear end of the frame 10 so that the bearings 29 can be positioned beneath end portions of the rod 30. By then raising the arms 9 the rear end of the frame 10 will be raised for elevating the wire roll 31 to its full or dotted line position of Figure 2 for conveying the roll of wire or for unloading it onto a truck. Similarly, with the frame 10 in substantially its position of Figure 2 and as seen in dotted lines therein, a roll of wire may be unloaded from a truck, all of which operations may be accomplished without manually lifting the roll. With the wire roll supported in its full or dotted line position of Figure 2, the wire may be unwound from the roll as the tractor 6 moves forward or from right to left of Figures 1 and 2 for laying the wire in a position to be attached to fence posts. Similarly, wire may be wound in a roll or spool by backing the tractor 6 and simultaneously revolving the wire with or about the rod 30 in a counterclockwise direction as seen in Figure 2. When the frame 10 is swung vertically, as previously described, the yokes 21 slide circumferentially with respect to the axle housing 7. The level of the frame 10 may be varied by extending or retracting the complementary standard sections 18 and 20. The collars 27 may be adjusted longitudinally of the arm portions 13 for accommodating rolls of wire of different diameters. The wire support 5 may be utilized with tractors not provided with hydraulic or mechanical hoists by connecting the links 25 or the studs 24 to the drawbar or other convenient part of the tractor, not shown, and in which case it will not be possible to raise or lower the frame 10.

Various modifications and changes are contemplated and may obviously be resorted to, without departing from the spirit or scope of the invention as hereinafter defined by the appended claims.

I claim as my invention:

1. A wire roll support comprising an elongated rigid frame having a forward end and a rear end, upwardly opening yoke members rigidly secured to laterally spaced portions of the frame and adjacent its forward end and disposed thereabove and adapted to turnably engage beneath and against portions of the rear axle housing of a prime mover, means connecting the frame to the prime mover rearwardly of said yokes for supporting the frame on the prime mover at two longitudinally spaced points on the frame, said frame having an open rear end adapted to receive a roll of wire therein, laterally aligned upwardly opening bearings adjacent the rear end of said frame, and an axle member adapted to extend axially through the wire roll and supported and journaled in said bearing members for supporting the wire roll in the open rear end of the frame.

2. A wire roll support as in claim 1, said means comprising a pair of links having corresponding ends pivotally connected to the frame rearwardly of said yokes, the opposite ends of said links being pivotally connected to hoist arms of the prime mover for raising and lowering the frame on the yokes and rear axle housing as a pivot.

3. The combination with a prime mover having a rear axle housing and vertically swinging hoist arms disposed above the rear axle housing and extending rearwardly therefrom, of a rod adapted to extend axially through a roll of wire and having end portions extending beyond the ends thereof, an elongated frame having a forward end disposed beneath the rear axle housing and an open rear end, a pair of links each having an end pivoted to the frame intermediate of the ends of the frame, said links being pivoted to the frame in transverse alignment and extending upwardly from the frame and having opposite ends pivotally and detachably connected to said hoist arms, said forward end of the frame having only bearing engagement against the underside of the rear axle housing to provide a fulcrum for vertical swinging movement of the frame when the hoist arms are raised and lowered, and said frame having upwardly opening transversely spaced bearings at its rear end detachably engaging under the end portions of the rod when the roll of wire is positioned in the open rear end of the frame to pick up, raise, lower and release the roll of wire and for rotatably supporting the roll of wire to wind wire thereon or to unwind wire therefrom.

WILBUR ADEN.

REFERENCES CITED

The following references are of record in the file of this patent:

UNITED STATES PATENTS

| Number | Name | Date |
|---|---|---|
| Re. 22,912 | Gaertner | Sept. 9, 1947 |
| 365,448 | Severson | June 28, 1887 |
| 391,404 | De Witt | Oct. 23, 1888 |
| 1,054,313 | Richardson | Feb. 25, 1913 |
| 1,299,550 | Buck | Apr. 8, 1919 |
| 1,729,084 | Pearson | Sept. 24, 1929 |
| 1,774,008 | Hester | Aug. 26, 1930 |
| 2,317,578 | Arps | Apr. 27, 1943 |
| 2,346,757 | Horner | Apr. 18, 1944 |
| 2,463,305 | Poor | Mar. 1, 1949 |
| 2,464,224 | Grabert | Mar. 15, 1949 |